(12) United States Patent
Imbe

(10) Patent No.: US 10,532,695 B2
(45) Date of Patent: Jan. 14, 2020

(54) VEHICLE MONITORING DEVICE, VEHICLE MONITORING METHOD AND VEHICLE MONITORING PROGRAM

(71) Applicant: JVC KENWOOD Corporation, Yokohama-shi, Kanagawa (JP)

(72) Inventor: Satoru Imbe, Yokohama (JP)

(73) Assignee: JVCKENWOOD CORPORATION, Yokohama-Shi, Kanagawa (JP)

( * ) Notice: Subject to any disclaimer, the term of this patent is extended or adjusted under 35 U.S.C. 154(b) by 108 days.

(21) Appl. No.: 15/703,657

(22) Filed: Sep. 13, 2017

(65) Prior Publication Data

US 2018/0001819 A1 Jan. 4, 2018

Related U.S. Application Data

(63) Continuation of application No. PCT/JP2016/001137, filed on Mar. 2, 2016.

(30) Foreign Application Priority Data

Mar. 13, 2015 (JP) .................................. 2015-050584

(51) Int. Cl.
*G08G 1/16* (2006.01)
*B60Q 9/00* (2006.01)
(Continued)

(52) U.S. Cl.
CPC ................ *B60Q 9/008* (2013.01); *B60R 1/00* (2013.01); *B60R 21/00* (2013.01); *G06K 9/00771* (2013.01); *G06K 9/00805* (2013.01); *G06T 7/11* (2017.01); *G08G 1/166* (2013.01); *G08G 1/167* (2013.01); *B60R 2300/8066* (2013.01)

(58) Field of Classification Search
None
See application file for complete search history.

(56) References Cited

U.S. PATENT DOCUMENTS

2011/0199197 A1* 8/2011 Takatsudo ................. B60R 1/00
340/425.5
2012/0140072 A1* 6/2012 Murashita .......... G06K 9/00805
348/148
2012/0293357 A1* 11/2012 Nishigaki ............. G01S 17/023
342/52

FOREIGN PATENT DOCUMENTS

CN 102203837 A 9/2011
CN 102713989 A 10/2012
(Continued)

*Primary Examiner* — Pankaj Kumar
*Assistant Examiner* — Charles N Hicks
(74) *Attorney, Agent, or Firm* — Procopio, Cory, Hargreaves & Savitch LLP

(57) ABSTRACT

A vehicle monitoring device includes a determination unit that determines whether a following vehicle shown in an image taken by a camera that takes an image of a surrounding area of a host vehicle is a two-wheel vehicle or not, and a warning unit that issues a warning when an inter-vehicle distance between the following vehicle and the host vehicle becomes equal to or less than a first distance in a case where the following vehicle is determined not to be a two-wheel vehicle by the determination unit, and issues a warning when the inter-vehicle distance between the following vehicle and the host vehicle becomes equal to or less than a second distance, which is longer than the first distance, in a case where the following vehicle is determined to be a two-wheel vehicle by the determination unit.

8 Claims, 7 Drawing Sheets

(51) Int. Cl.
    *B60R 21/00*     (2006.01)
    *G06T 7/11*     (2017.01)
    *B60R 1/00*     (2006.01)
    *G06K 9/00*     (2006.01)

(56) References Cited

FOREIGN PATENT DOCUMENTS

| | | |
|---|---|---|
| JP | 2006-251894 A | 9/2006 |
| JP | 2007-286873 A | 11/2007 |
| JP | 2011-096289 A | 5/2011 |
| JP | 2011-189916 A | 9/2011 |
| JP | 2014-182543 A | 9/2014 |

\* cited by examiner

VEHICLE MONITORING DEVICE, VEHICLE MONITORING METHOD AND VEHICLE MONITORING PROGRAM

CROSS REFERENCE TO RELATED APPLICATION

This application is a continuation application from PCT application No. PCT/JP2016/001137, filed Mar. 2, 2016, which is based upon and claims the benefit of priority from Japanese patent application No. 2015-050584, filed on Mar. 13, 2015, the disclosure of which is incorporated herein in its entirety by reference.

BACKGROUND

The present invention relates to a vehicle monitoring device, a vehicle monitoring method and a vehicle monitoring program and, particularly, relates to a vehicle monitoring device, a vehicle monitoring method and a vehicle monitoring program that issue a warning to a driver at the timing according to the type of vehicle of an object shown in an image taken by a camera.

A two-wheel vehicle approaching from behind a host vehicle sometimes goes past the host vehicle or accelerates and follows closely to overtake the host vehicle. Therefore, when a two-wheel vehicle is approaching from behind a host vehicle, it is required to notify a driver of that as soon as possible.

For example, Japanese Unexamined Patent Application Publication No. 2006-251894 discloses a navigation device that determines the type of a movable body such as a pedestrian, a two-wheel vehicle or an ordinary vehicle from the outline, size or the like of the movable body.

Further, Japanese Unexamined Patent Application Publication No. 2007-286873 discloses a surrounding vehicle presentation device that performs recognition of a four-wheel vehicle and a two-wheel vehicle located in a first range which is the closest to a host vehicle, performs recognition of a four-wheel vehicle located in a second range which is the next closest to the host vehicle, and when a four-wheel vehicle is located in the second range, performs recognition of a two-wheel vehicle located in a third range which is on the left and right and diagonally behind the four-wheel vehicle.

SUMMARY

However, the configuration of the related art has a problem that, while it is possible to recognize the type of a vehicle approaching from behind a host vehicle, it is not possible to recognize the approach of a two-wheel vehicle from behind a host vehicle at the timing earlier than another type of vehicle.

A vehicle monitoring device according to a first aspect of the embodiment includes a determination unit configured to determine whether an object shown in an image taken by a camera that takes an image of a surrounding area behind a host vehicle is a two-wheel vehicle or not, and a warning unit configured to issue a warning to a driver when an inter-vehicle distance between the object and the host vehicle becomes equal to or less than a first distance in a case where the object is determined not to be a two-wheel vehicle by the determination unit, and configured to issue a warning to a driver when the inter-vehicle distance between the object and the host vehicle becomes equal to or less than a second distance, which is longer than the first distance, in a case where the object is determined to be a two-wheel vehicle by the determination unit.

A vehicle monitoring method according to a second aspect of the embodiment includes a step of determining whether an object shown in an image taken by a camera that takes an image of a surrounding area behind a host vehicle is a two-wheel vehicle or not, and a step of issuing a warning to a driver when an inter-vehicle distance between the object and the host vehicle becomes equal to or less than a first distance in a case where the object is determined not to be a two-wheel vehicle, and issuing a warning to a driver when the inter-vehicle distance between the object and the host vehicle becomes equal to or less than a second distance, which is longer than the first distance, in a case where the object is determined to be a two-wheel vehicle.

A non-transitory computer readable medium storing a vehicle monitoring program according to a third aspect of the embodiment causes a computer to execute processing of determining whether an object shown in an image taken by a camera that takes an image of a surrounding area behind a host vehicle is a two-wheel vehicle or not, and processing of issuing a warning to a driver when an inter-vehicle distance between the object and the host vehicle becomes equal to or less than a first distance in a case where the object is determined not to be a two-wheel vehicle, and issuing a warning to a driver when the inter-vehicle distance between the object and the host vehicle becomes equal to or less than a second distance, which is longer than the first distance, in a case where the object is determined to be a two-wheel vehicle.

DETAILED DESCRIPTION

Specific exemplary embodiments will be described hereinafter in detail with reference to the drawings. It is noted that in the description of the drawings, the same elements will be denoted by the same reference symbols and redundant description will be omitted to clarify the explanation.

First Embodiment

Figure 1:
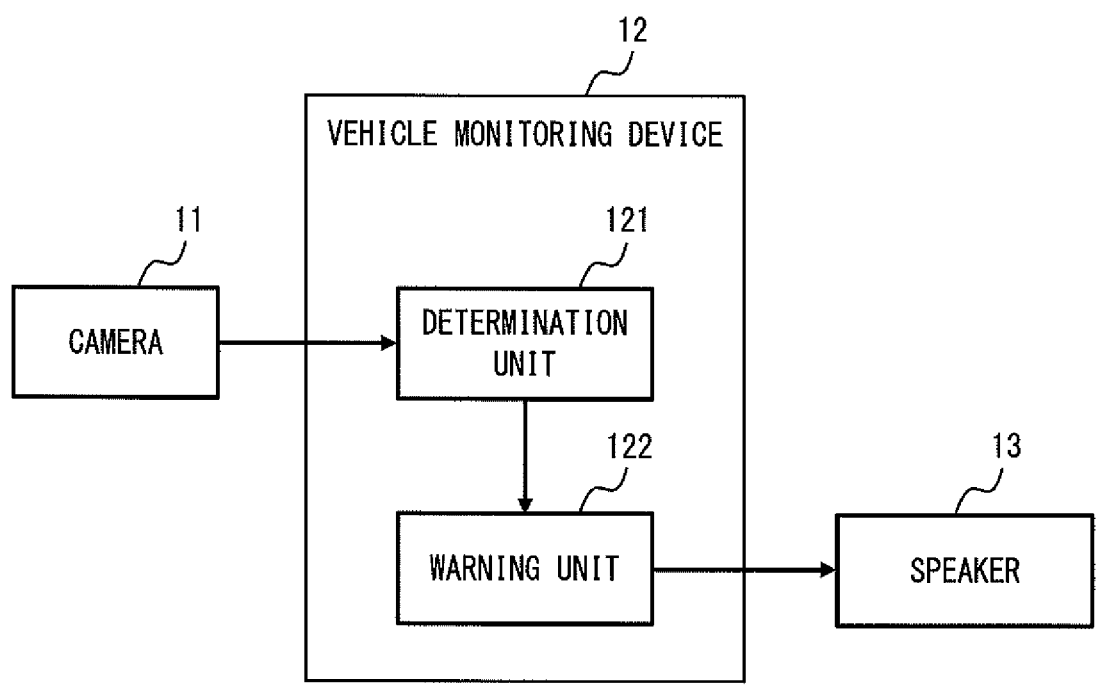
FIG. 1 is a block diagram showing a configuration of a vehicle monitoring system according to a first embodiment.

FIG. 1 is a block diagram showing the configuration of a vehicle monitoring system on which a vehicle monitoring device according to a first embodiment is mounted. The vehicle monitoring device according to this embodiment and the vehicle monitoring system including the same issue a warning to a driver when an inter-vehicle distance becomes equal to or less than a first distance in the case where a following vehicle is not a two-wheel vehicle, and issue a warning to a driver when an inter-vehicle distance becomes equal to or less than a second distance, which is longer than the first distance, in the case where a following vehicle is a two-wheel vehicle. The vehicle monitoring device according to this embodiment and the vehicle monitoring system including the same can thereby make a warning to a driver at appropriate timing according to the type of following vehicle.

As shown in FIG. 1, a vehicle monitoring system 1 includes a camera 11, a vehicle monitoring device 12, and a speaker 13.

(Camera 11)

The camera 11 takes an image of the surrounding area of a host vehicle 40. The camera 11 at least takes an image of the surrounding area behind the host vehicle 40.

(Placement Example of Camera 11)

Figure 2:
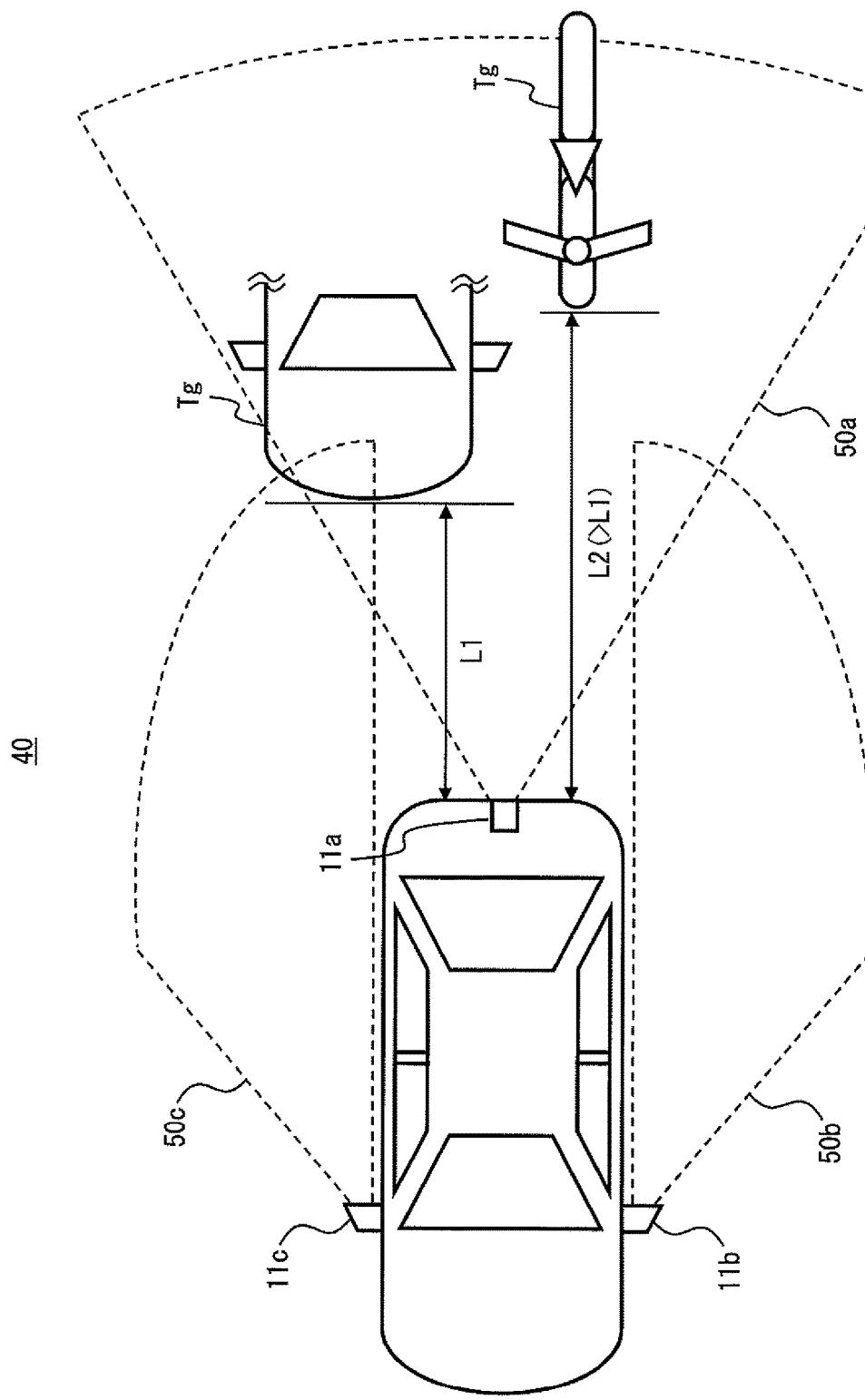
FIG. 2 is a conceptual diagram showing a top view of a moving host vehicle on which the vehicle monitoring system shown in FIG. 1 is mounted.

FIG. 2 is a conceptual diagram showing a top view of the moving host vehicle 40 on which the vehicle monitoring system 1 is mounted. A following vehicle Tg is also shown in FIG. 2.

As shown in FIG. 2, three cameras 11a, 11b and 11c are placed as the camera 11 in the host vehicle 40.

The camera 11a is placed in the rear of the host vehicle 40. The camera 11a takes an image of the area behind the host vehicle 40 (imaging range 50a), in the surrounding area of the host vehicle 40. The camera 11b is placed at the position corresponding to the left side mirror of the host vehicle 40. The camera 11b takes an image of the area on the left and diagonally left behind the host vehicle 40 (imaging range 50b), in the surrounding area of the host vehicle 40. The camera 11c is placed at the position corresponding to the right side mirror of the host vehicle 40. The camera 11c takes an image of the area on the right and diagonally right behind the host vehicle 40 (imaging range 50c), in the surrounding area of the host vehicle 40.

Note that the number of cameras 11 is not limited to three. For example, only the camera 11 that can take an image of the surrounding area behind the host vehicle 40 may be placed.

(Vehicle Monitoring Device 12)

The vehicle monitoring device 12 includes a determination unit 121 and a warning unit 122.

The determination unit 121 detects the following vehicle (object) Tg from an image taken by the camera 11, and when the following vehicle (object) Tg is detected, determines whether the following vehicle Tg shown in the image is a two-wheel vehicle or not. For example, the determination unit 121 detects the following vehicle (object) Tg by performing pattern matching by using a parameter such as luminance, color or edge of pixels. Further, for example, the determination unit 121 determines whether the following vehicle Tg is a two-wheel vehicle or not from the position, size, outline or the like of the following vehicle Tg. Note that the detection of the following vehicle (object) Tg may be performed by a following vehicle detection unit which is different from the determination unit 121.

Further, the determination unit 121 has a function of calculating the inter-vehicle distance between the host vehicle 40 and the following vehicle Tg from a change in the position, size or the like of the following vehicle Tg shown in an image taken by the camera 11. As a matter of course, a circuit that calculates the inter-vehicle distance may be placed separately from the determination unit 121.

The warning unit 122 is a unit that issues a warning to a driver by using the speaker 13 or the like mounted on the host vehicle 40 when the inter-vehicle distance between the host vehicle 40 and the following vehicle Tg becomes equal to or less than a specified distance.

Referring to FIG. 2, when the determination unit 121 determines that the following vehicle Tg is not a two-wheel vehicle (for example, it is a four-wheel automobile), the warning unit 122 issues a warning by using the speaker 13 when the inter-vehicle distance between the host vehicle 40 and the following vehicle Tg becomes equal to or less than a distance (first distance) L1. Further, when the determination unit 121 determines that the following vehicle Tg is a two-wheel vehicle, the warning unit 122 issues a warning by using the speaker 13 when the inter-vehicle distance between the host vehicle 40 and the following vehicle Tg becomes equal to or less than a distance (second distance) L2, which is longer than the distance L1.

(Speaker 13)

The speaker 13 is mounted on the host vehicle 40, and it converts output information (warning) from the warning unit 122 into a sound and outputs it.

(Hardware Configuration of Vehicle Monitoring Device 12)

Figure 3:
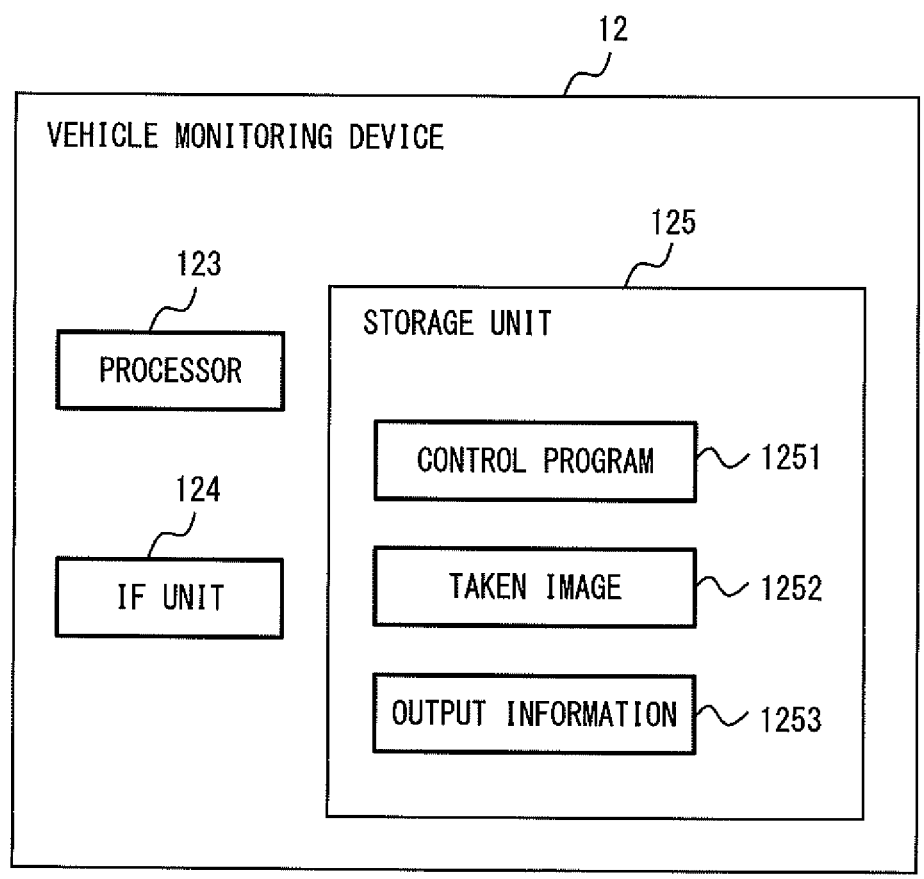
FIG. 3 is a block diagram showing a hardware configuration of a vehicle monitoring device placed in the vehicle monitoring system shown in FIG. 1.

FIG. 3 is a block diagram showing the hardware configuration of the vehicle monitoring device 12.

As shown in FIG. 3, the vehicle monitoring device 12 at least includes a processor 123, an IF (InterFace) unit 124, and a storage unit 125.

The storage unit 125 is a storage device such as a memory. The storage unit 125 stores a control program 1251, a taken image 1252, and output information 1253.

The control program 1251 is a computer program in which a control method of the vehicle monitoring device 12 and, particularly, a warning method according to the type of following vehicle Tg, is implemented. The taken image 1252 is an image that is taken by the camera 11. The output information 1253 is information for issuing a warning to a driver against the following vehicle Tg approaching the host vehicle 40 by being output as a sound through the speaker 13, for example.

The processor 123 is a control device such as a CPU (Central Processing Unit). The IF unit 124 is an interface for inputting and outputting data to and from the outside of the vehicle monitoring device 12. Thus, the IF unit 124 receives the taken image 1252 from the camera 11. Further, the IF unit 124 outputs the output information 1253 to the speaker 13 for outputting it as a sound.

The processor 123 reads the control program 1251 from the storage unit 125 and executes it. The vehicle monitoring device 12 thereby operates as the determination unit 121, the warning unit 122 and the like.

(Flowchart)

Figure 4:
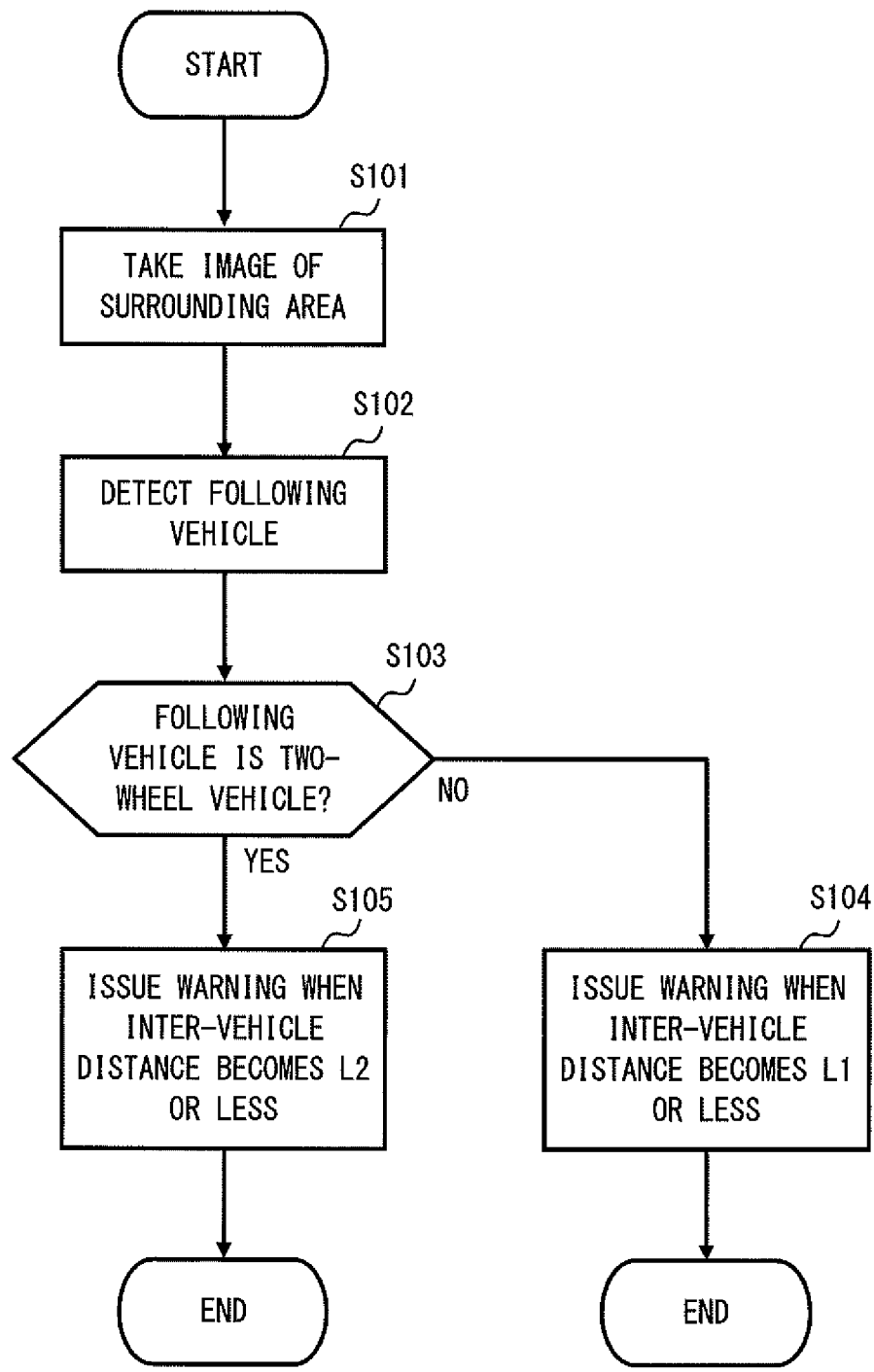
FIG. 4 is a flowchart showing an example of a method of monitoring a following vehicle by the vehicle monitoring system shown in FIG. 1.

FIG. 4 is a flowchart showing an example of a monitoring method by the vehicle monitoring system 1.

First, the camera 11 takes an image of the surrounding area behind the host vehicle 40 (Step S101). The IF unit 124 thereby receives the image taken from the camera 11, and the processor 123 stores it as the taken image 1252 into the storage unit 125. Note that the image-taking by the camera 11 (Step S101) is performed at a short cycle or in succession.

After that, when the determination unit 121 detects the following vehicle Tg shown in the taken image 1252 (Step S102), it determines whether the following vehicle Tg is a two-wheel vehicle or not based on the position, size, outline or the like (Step S103). For example, the following vehicle Tg is determined to be a two-wheel vehicle when the size of the following vehicle Tg is smaller than a reference value or when the following vehicle Tg is located near a traffic lane line.

For example, when the determination unit 121 determines that the following vehicle Tg is not a two-wheel vehicle (for example, it is a four-wheel automobile) (No in Step S103), the warning unit 122 generates the output information 1253 for issuing a warning to a driver and outputs it to the speaker 13 when the inter-vehicle distance between the host vehicle 40 and the following vehicle Tg becomes equal to or less than the distance L1. The speaker 13 outputs the output information 1253 as a sound, and thereby issues a warning to a driver (Step S104).

On the other and, when the determination unit 121 determines that the following vehicle Tg is a two-wheel vehicle (Yes in Step S103), the warning unit 122 generates the output information 1253 for issuing a warning to a driver and outputs it to the speaker 13 when the inter-vehicle distance between the host vehicle 40 and the following vehicle Tg becomes equal to or less than the distance L2, which is longer than the distance L1. The speaker 13 outputs the output information 1253 as a sound, and thereby issues a warning to a driver (Step S105).

The above-described inter-vehicle distance may be measured by using an infrared sensor or the like, by comparing subjects (following vehicle Tg) of images taken by two cameras, or by using the TOF technique that applies pulse-modulated invisible light such as infrared light to the angle of view of a camera and measures the phase delay of this pulse by an image sensor of the camera.

Note that a warning that is issued when the following vehicle is determined not to be a two-wheel vehicle and the inter-vehicle distance becomes equal to or less than the distance L1 and a warning that is issued when the following vehicle is determined to be a two-wheel vehicle and the inter-vehicle distance becomes equal to or less than the distance L2 (>L1) may be different from each other. For different warnings, the volume, quality or tone of warnings may be differentiated, for example.

In this manner, the vehicle monitoring device and the vehicle monitoring system according to the first embodiment issue a warning when the inter-vehicle distance becomes equal to or less than the first distance in the case where a following vehicle is not a two-wheel vehicle, and issues a warning when the inter-vehicle distance becomes equal to or less than the second distance, which is longer than the first distance, in the case where a following vehicle is a two-wheel vehicle. A driver can thereby recognize, at early timing, that a two-wheel vehicle that might go past a host vehicle or accelerate and follow closely to overtake a host vehicle is approaching from behind.

Although the case where a warning is issued when a vehicle is approaching from behind the host vehicle 40 is described as an example in this embodiment, the exemplary embodiment is not limited thereto. If necessary, it is feasible to issue a warning when a vehicle is approaching from the front of the host vehicle 40.

(Modified Example of Vehicle Monitoring Device 12 and Vehicle Monitoring System 1)

A modified example of the vehicle monitoring device 12 and the vehicle monitoring system 1 is described hereinafter with reference to FIG. 5.

Figure 5:
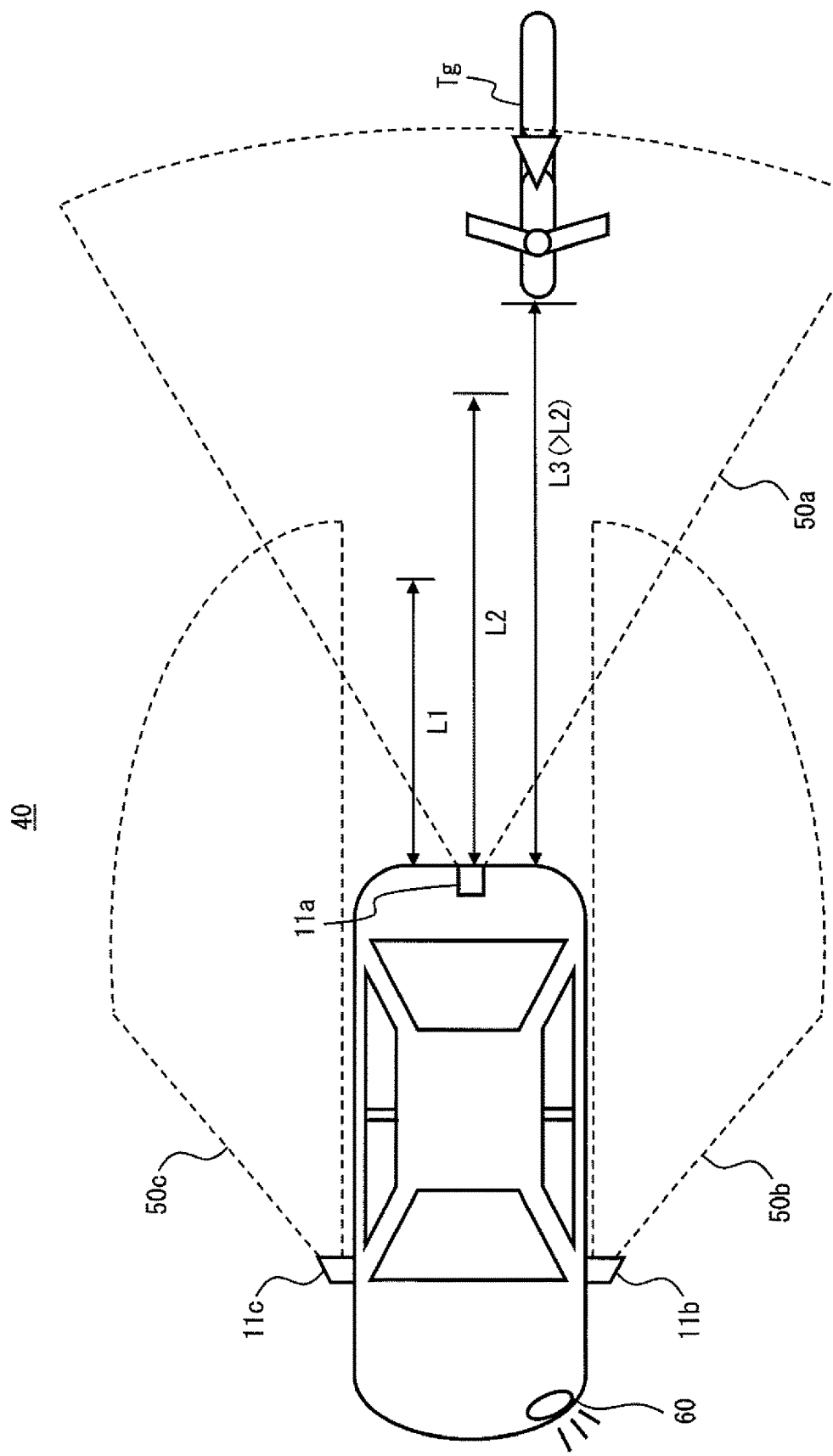
FIG. 5 is a conceptual diagram showing a top view of another example of a moving host vehicle on which the vehicle monitoring system shown in FIG. 1 is mounted.

FIG. 5 is a conceptual diagram showing a top view of another example of the moving host vehicle 40 on which the vehicle monitoring system 1 is mounted. Note that the following vehicle Tg is also shown in FIG. 5.

Referring to FIG. 5, in the case where a turn signal 60 indicating that host vehicle 40 is about to turn left is being used and further the determination unit 121 determines that the following vehicle Tg is a two-wheel vehicle, a driver needs to give particular attention to the approach of a two-wheel vehicle, and therefore the warning unit 122 issues a warning at the earlier timing. To be specific, the warning unit 122 issues a warning to a driver when the inter-vehicle distance between the host vehicle 40 and the following vehicle Tg becomes equal to or less than a distance (third distance) L3, which is longer than the distance L2.

Note that the inter-vehicle distance at which a warning is issued may be changed from equal to or less than the distance L2 to equal to or less than the distance L3 also in the case where the host vehicle 40 is steered to the left, for example, not limited to the case where a turn signal indicating a left turn of the host vehicle 40 is being used.

Note that a warning that is issued at this time may be different from a warning that is issued when the following vehicle is determined not to be a two-wheel vehicle and the inter-vehicle distance becomes equal to or less than the distance L1 and a warning that is issued when the following vehicle is determined to be a two-wheel vehicle and the inter-vehicle distance becomes equal to or less than the distance L2. For example, the volume, quality or tone of warnings may be differentiated.

Second Embodiment

Figure 6:
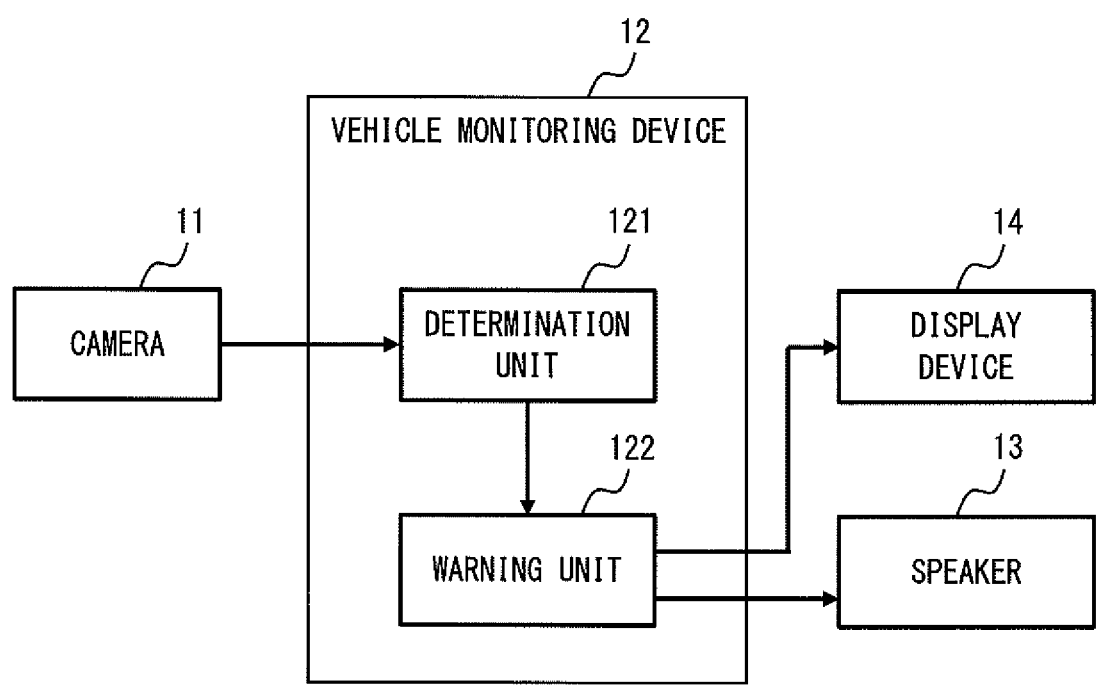
FIG. 6 is a block diagram showing a configuration of a vehicle monitoring system according to a second embodiment.

FIG. 6 is a block diagram showing a configuration example of a vehicle monitoring system on which a vehicle monitoring device according to a second embodiment is mounted. A vehicle monitoring system 2 shown in FIG. 6 further includes a display device 14 compared with the vehicle monitoring system 1 shown in FIG. 1.

The display device 14 is a device that displays an image taken by the camera 11 on a screen. The display device 14 may be used also as a general car navigation system. The display device is an organic EL display or a plasma display, for example.

When the inter-vehicle distance between the following vehicle Tg that is determined to be a two-wheel vehicle and the host vehicle 40 becomes equal to or less than the distance L2, the warning unit 122 generates output information for issuing a warning to a driver and outputs it to the display device 14. The display device 14 receives the output information and displays this following vehicle Tg with highlights in contrast with the following vehicle Tg that is determined not to be a two-wheel vehicle, thereby issuing a warning to a driver.

For example, the warning unit 122 generates a video signal where a box is drawn around the following vehicle Tg determined to be a two-wheel vehicle, a video signal where the following vehicle Tg determined to be a two-wheel vehicle is blinking on and off, or a video signal where a mark is placed near the following vehicle Tg determined to be a two-wheel vehicle, and outputs the video signal to the display device 14 so that the display device 14 displays that image, thereby issuing a warning to a driver. Note that, as for the generation of a video signal, the display device 14 may receive a signal indicating a warning which is generated by the warning unit 122 and generate a video signal.

Further, a warning that is issued when the following vehicle is determined not to be a two-wheel vehicle and the inter-vehicle distance becomes equal to or less than the distance L1, a warning that is issued when the following vehicle is determined to be a two-wheel vehicle and the inter-vehicle distance becomes equal to or less than the distance L2, and a warning that is issued when a turn signal or the like is used, the following vehicle is determined to be a two-wheel vehicle and the inter-vehicle distance becomes equal to or less than the distance L3 may be different from one another. For example, the way of drawing a box around the following vehicle Tg, the way of blinking on and off, the way of placing a mark or the like may be differentiated among them.

The other configuration of the vehicle monitoring system 2 is the same as that of the vehicle monitoring system 1, and the description thereof is omitted.

As described above, the vehicle monitoring system 2 highlights a two-wheel vehicle displayed on a screen of the display device 14, not only outputting a sound, and it is thereby possible to more clearly give a warning to a driver about the two-wheel vehicle approaching from behind.

Note that the vehicle monitoring system 2 may issue a warning to a driver only by highlighting a two-wheel vehicle displayed on a screen of the display device 14, without outputting a sound.

Figure 7:
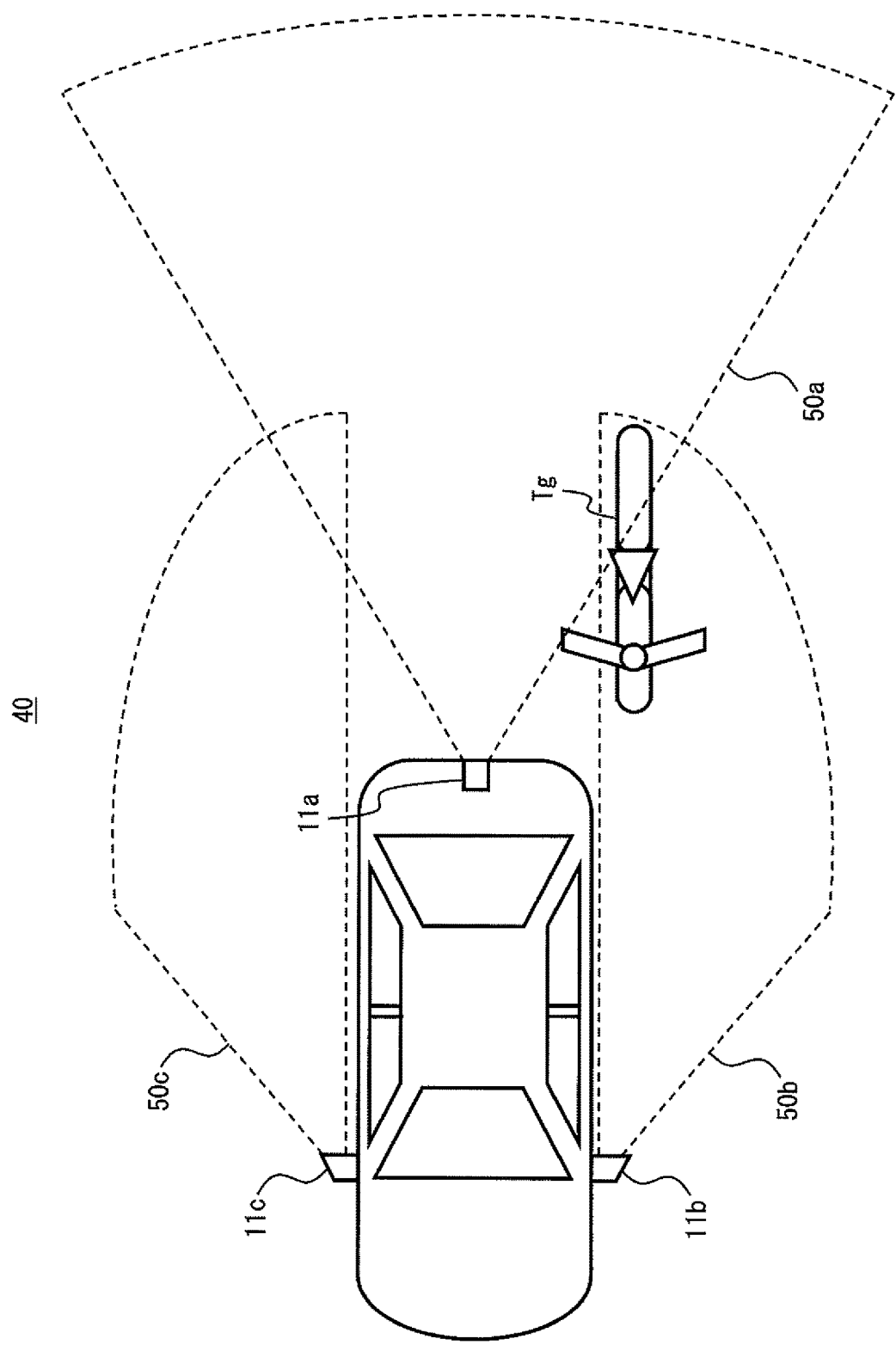
FIG. 7 is a conceptual diagram showing a top view of a moving host vehicle on which the vehicle monitoring system shown in FIG. 6 is mounted.

Further, in the case where the following vehicle Tg determined to be a two-wheel vehicle is located in a specified area (imaging range 50b) on the left behind the host vehicle 40 as shown in FIG. 7, the specified area may be entirely displayed on the screen of the display device 14. To be specific, an image to be displayed on the screen of the display device 14 may be changed from the image taken by a camera 11a that takes an image of the surrounding area (imaging range 50a) behind the host vehicle 40 to the image taken by a camera 11b that takes an image of the specified area (imaging range 50b) on the left behind the host vehicle 40.

Other Embodiments

Although the exemplary embodiments are described in the foregoing, the exemplary embodiment is not restricted to the above-described configuration, and various changes, modifications and combinations as would be obvious to one skilled in the art may be made without departing from the scope of the invention.

Further, arbitrary processing of the on-vehicle device described above may be implemented by causing a CPU (Central Processing Unit) to execute a computer program to perform given processing. In this case, the computer program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

Further, in addition to the case where the functions of the above-described exemplary embodiment are implemented by causing a computer to execute a program for implementing the functions of the above-described exemplary embodiment, the case where the functions of the above-described exemplary embodiment are implemented by this program in cooperation with the an OS (Operating System) or application software running on the computer is also included in the exemplary embodiment. Further, the case where all or part of the processes of this program are executed by a function enhancement board inserted into the computer or a function enhancement unit connected to the computer to implement the functions of the above-described exemplary embodiment is also included in the exemplary embodiment.

The exemplary embodiment is suitably applicable to a vehicle monitoring device that can be mounted on a host vehicle, a vehicle monitoring method and a vehicle monitoring program.

It is possible to provide a vehicle monitoring device, a vehicle monitoring method and a vehicle monitoring program capable of issuing a warning to a driver at appropriate timing according to the type of following vehicle.

What is claimed is:

1. A vehicle monitoring device comprising:
a storage device storing a control program; and
at least one processor coupled to the storage device and configured to execute the control program to;
determine whether an object shown in an image taken by a camera that takes an image of a surrounding area behind a host vehicle is a vehicle having only two-wheels or not, and
issue a warning to a driver when an inter-vehicle distance between the object and the host vehicle becomes equal to or less than a first distance in a case where the object is determined not to be a vehicle having only two-wheels, and issue a warning to a driver when the inter-vehicle distance between the object and the host vehicle becomes equal to or less than a second distance, which is longer than the first distance, in a case where the object is determined to be a vehicle having only two-wheels.

2. The vehicle monitoring device according to claim 1, wherein the at least one processor is configured to execute the control program to issue different warnings between when the inter-vehicle distance between the object and the host vehicle becomes equal to or less than the first distance in the case where the object is determined not to be a vehicle having only two-wheels, and when the inter-vehicle distance between the object and the host vehicle becomes equal to or less than the second distance in the case where the object is determined to be a vehicle having only two-wheels.

3. The vehicle monitoring device according to claim 1, wherein, in a case where the object determined to be a vehicle having only two-wheels is located in a specified area on left behind or on right behind the host vehicle, the at least one processor is configured to execute the control program to display, on a screen of a display device, an image of the entire specified area on a side where the object is located.

4. The vehicle monitoring device according to claim 1, wherein, in a case where an operation of changing a traveling direction of the host vehicle is performed, the at least one processor is configured to execute the control program to issue a warning to a driver when the inter-vehicle distance between the object determined to be a vehicle having only two-wheels and the host vehicle becomes equal to or less than a third distance, which is longer than the second distance.

5. The vehicle monitoring device according to claim 4, wherein the at least one processor is configured to execute the control program to issue different warnings between when the inter-vehicle distance between the object and the host vehicle becomes equal to or less than the second distance in the case where the object is determined to be a vehicle having only two-wheels, and when the inter-vehicle distance between the object and the host vehicle becomes equal to or less than the third distance in the case where the operation of changing the traveling direction is performed and the object is determined to be a vehicle having only two-wheels.

6. A vehicle monitoring system comprising:
a camera that takes an image of a surrounding area behind a host vehicle; and
the vehicle monitoring device according to claim 1.

7. A vehicle monitoring method comprising:
determining, by at least one processor, whether an object shown in an image taken by a camera that takes an image of a surrounding area behind a host vehicle is a vehicle having only two-wheels or not; and
issuing a warning, by the at least one processor, to a driver when an inter-vehicle distance between the object and the host vehicle becomes equal to or less than a first distance in a case where the object is determined not to be a vehicle having only two-wheels, and issuing a warning to a driver when the inter-vehicle distance between the object and the host vehicle becomes equal to or less than a second distance, which is longer than the first distance, in a case where the object is determined to be a vehicle having only two-wheels.

8. A non-transitory computer readable medium storing a vehicle monitoring program that, when executed by a computer, cause the computer to:
determine whether an object shown in an image taken by a camera that takes an image of a surrounding area behind a host vehicle is a vehicle having only two-wheels or not; and
issue a warning to a driver when an inter-vehicle distance between the object and the host vehicle becomes equal to or less than a first distance in a case where the object is determined not to be a vehicle having only two-wheels, and issue a warning to a driver when the inter-vehicle distance between the object and the host vehicle becomes equal to or less than a second distance, which is longer than the first distance, in a case where the object is determined to be a vehicle having only two-wheels.

* * * * *